(12) United States Patent
Blesser

(10) Patent No.: US 9,454,343 B1
(45) Date of Patent: Sep. 27, 2016

(54) CREATING SPECTRAL WELLS FOR INSERTING WATERMARKS IN AUDIO SIGNALS

(71) Applicant: TLS Corp., Cleveland, OH (US)

(72) Inventor: Barry Blesser, Belmont, MA (US)

(73) Assignee: TLS CORP., Cleveland, OH (US)

( * ) Notice: Subject to any disclaimer, the term of this patent is extended or adjusted under 35 U.S.C. 154(b) by 0 days.

(21) Appl. No.: 14/803,655

(22) Filed: Jul. 20, 2015

(51) Int. Cl.
*G06F 17/00* (2006.01)
*G06F 3/16* (2006.01)
*H04L 9/08* (2006.01)
*H04N 21/8358* (2011.01)

(52) U.S. Cl.
CPC .............. *G06F 3/165* (2013.01); *H04L 9/0861* (2013.01); *G06T 2201/0052* (2013.01); *H04L 2209/608* (2013.01); *H04N 21/8358* (2013.01)

(58) Field of Classification Search
CPC .............. G10L 19/018; H04N 19/467; H04N 21/23892; H04N 21/8358; G06T 2201/0052; G06T 2201/0051; G06T 2201/0061
See application file for complete search history.

(56) References Cited

U.S. PATENT DOCUMENTS

| | | | |
|---|---|---|---|
| 5,029,217 A | 7/1991 | Chabries et al. |
| 5,450,490 A | 9/1995 | Jensen et al. |
| 5,483,276 A | 1/1996 | Brooks et al. |
| 5,574,962 A | 11/1996 | Fardeau et al. |
| 5,579,124 A | 11/1996 | Aija et al. |
| 5,581,800 A | 12/1996 | Fardeau et al. |
| 5,764,763 A | 6/1998 | Jensen et al. |
| 5,787,334 A | 7/1998 | Fardeau et al. |
| 6,421,445 B1 | 7/2002 | Jensen et al. |
| 6,571,144 B1 | 5/2003 | Moses et al. |
| 6,621,881 B2 | 9/2003 | Srinivasan |
| 6,674,876 B1 | 1/2004 | Hannigan et al. |
| 6,683,958 B2 | 1/2004 | Petrovic |
| 6,845,360 B2 | 1/2005 | Jensen et al. |
| 6,862,355 B2 | 3/2005 | Kolessar et al. |
| 6,871,180 B1 | 3/2005 | Neuhauser et al. |
| 6,996,237 B2 | 2/2006 | Jensen et al. |
| 7,031,491 B1 | 4/2006 | Donescu et al. |
| 7,222,071 B2 | 5/2007 | Neuhauser et al. |
| 7,239,981 B2 | 7/2007 | Kolessar et al. |
| 7,316,025 B1 | 1/2008 | Aijala et al. |
| 7,395,211 B2 | 7/2008 | Watson et al. |
| 7,471,987 B2 | 12/2008 | Crystal et al. |
| 7,483,835 B2 | 1/2009 | Neuhauser et al. |

(Continued)

FOREIGN PATENT DOCUMENTS

WO 2006116270 A2 11/2006

OTHER PUBLICATIONS

Arbitron, Critical Band Encoding Technology Audio Encoding System From Arbitron; Document 1050-1054; Revision E; pp. 1-27; Feb. 2008.

(Continued)

*Primary Examiner* — Curtis Kuntz
*Assistant Examiner* — Thomas Maung
(74) *Attorney, Agent, or Firm* — Renner, Otto, Boisselle & Sklar, LLP

(57) ABSTRACT

A method for a machine or group of machines to watermark an audio signal may include receiving the audio signal, receiving a watermark signal, creating a spectral well on the audio signal by removing a portion of the audio signal corresponding to a frequency range, and inserting the watermark signal in the spectral well.

17 Claims, 16 Drawing Sheets

(56) References Cited

U.S. PATENT DOCUMENTS

| | | |
|---|---|---|
| 7,483,975 B2 | 1/2009 | Kolessar et al. |
| 7,640,141 B2 | 12/2009 | Kolessar et al. |
| 7,664,274 B1 * | 2/2010 | Graumann ............ H04H 20/31 380/238 |
| 7,961,881 B2 | 6/2011 | Jensen et al. |
| RE42,627 E | 8/2011 | Neuhauser et al. |
| 8,099,285 B2 | 1/2012 | Smith et al. |
| 2003/0128861 A1 | 7/2003 | Rhoads |
| 2003/0219143 A1 | 11/2003 | Moskowitz et al. |
| 2003/0231785 A1 | 12/2003 | Rhoads et al. |
| 2004/0068399 A1 * | 4/2004 | Ding ................... G10L 21/038 704/200.1 |
| 2005/0157907 A1 | 7/2005 | Reed et al. |
| 2008/0275697 A1 | 11/2008 | Kentish et al. |
| 2009/0262932 A1 | 10/2009 | Petrovic |
| 2010/0057231 A1 * | 3/2010 | Slater ................... G10L 19/018 700/94 |
| 2010/0303284 A1 | 12/2010 | Hannigan et al. |
| 2011/0093104 A1 | 4/2011 | Blesser |
| 2011/0173012 A1 | 7/2011 | Rettelbach et al. |
| 2011/0238425 A1 | 9/2011 | Neuendorf et al. |
| 2011/0305352 A1 | 12/2011 | Villemoes et al. |
| 2012/0274459 A1 | 11/2012 | Jaisimha et al. |
| 2013/0173275 A1 | 7/2013 | Liu et al. |
| 2014/0297271 A1 | 10/2014 | Geiser |
| 2015/0071446 A1 | 3/2015 | Sun et al. |

OTHER PUBLICATIONS

Blesser, Barry, Director of Engineering, 25-Seven Systems, Inc.; Technical Properties of Arbitron's PPM System; pp. 1-8; Aug. 18, 2009.

International Search Report and Written Opinion dated Mar. 13, 2015 for corresponding International Application No. PCT/US2014/068485.

Non-Final Office Action dated Jan. 24, 2014 for U.S. Appl. No. 14/097,716.

Non-Final Office Action dated Feb. 20, 2014 for U.S. Appl. No. 14/145,681.

Non-Final Office Action dated Aug. 11, 2014 for U.S. Appl. No. 14/216,041.

* cited by examiner

CREATING SPECTRAL WELLS FOR INSERTING WATERMARKS IN AUDIO SIGNALS

FIELD OF THE INVENTION

The present disclosure relates to audio processing. More particularly, the present disclosure relates to methods and machines for creating and enhancing spectral wells for inserting watermark in audio signals.

BACKGROUND

Audio watermarking is the process of embedding information in audio signals. To embed this information, the original audio may be changed or new components may be added to the original audio. Watermarks may include information about the audio including information about its ownership, distribution method, transmission time, performer, producer, legal status, etc. The audio signal may be modified such that the embedded watermark is imperceptible or nearly imperceptible to the listener, yet may be detected through an automated detection process.

Watermarking systems typically have two primary components: an encoder that embeds the watermark in a host audio signal, and a decoder that detects and reads the embedded watermark from an audio signal containing the watermark. The encoder embeds a watermark by altering the host audio signal. Watermark symbols may be encoded in a single frequency band or, to enhance robustness, symbols may be encoded redundantly in multiple different frequency bands. The decoder may extract the watermark from the audio signal and the information from the extracted watermark.

The watermark encoding method may take advantage of perceptual masking of the host audio signal to hide the watermark. Perceptual masking refers to a process where one sound is rendered inaudible in the presence of another sound. This enables the host audio signal to hide or mask the watermark signal during the time of the presentation of a loud tone, for example. Perceptual masking exists in both the time and frequency domains. In the time domain, sound before and after a loud sound may mask a softer sound, so called forward masking (on the order of 50 to 300 ms) and backward masking (on the order of 1 to 5 ms). Masking is a well know psychoacoustic property of the human auditory system. In the frequency domain, small sounds somewhat higher or lower in frequency than a loud sound's spectrum are also masked even when occurring at the same time. Depending on the frequency, spectral masking may cover several 100 Hz.

The watermark encoder may perform a masking analysis to measure the masking capability of the audio signal to hide a watermark. The encoder models both the temporal and spectral masking to determine the maximum amount of watermarking energy that can be injected. However, the decoder can only be successful if the signal to noise ratio (S/N) is adequate, and the peak amplitude of the watermarking is only part of that ratio. One needs to consider the noise experienced by the decoder. There are multiple noise sources but there is one noise source that can dominate: the energy in the audio program that exists at the same time and frequency of the watermarking.

The audio program both creates the masking envelop and it exists at the same time and frequency of the injected watermark. The watermark peak is determined by the masking and the watermark's noise is determined by the residual audio program. These two parameters determine the S/N. The S/N may be insufficient for the decoder to successfully extract the information.

SUMMARY OF THE INVENTION

The present disclosure provides methods and machines for creating and enhancing spectral wells for inserting watermarks in audio signals. The spectral wells correspond to a reduction or attenuation of energy of the audio signal to reduce the likelihood of the audio signal interfering with the decoder's ability to decode the watermark. Spectral wells improve the decoder's performance by increasing the S/N. Inserting the watermark in an audio signal in which a spectral well has been created may increase the ability of the decoder to effectively decode the watermark.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Although the present disclosure describes various embodiments in the context of watermarking station identification codes into the station audio programming to identify which stations people are listening to, it will be appreciated that this exemplary context is only one of many potential applications in which aspects of the disclosed systems and methods may be used.

Figure 1:
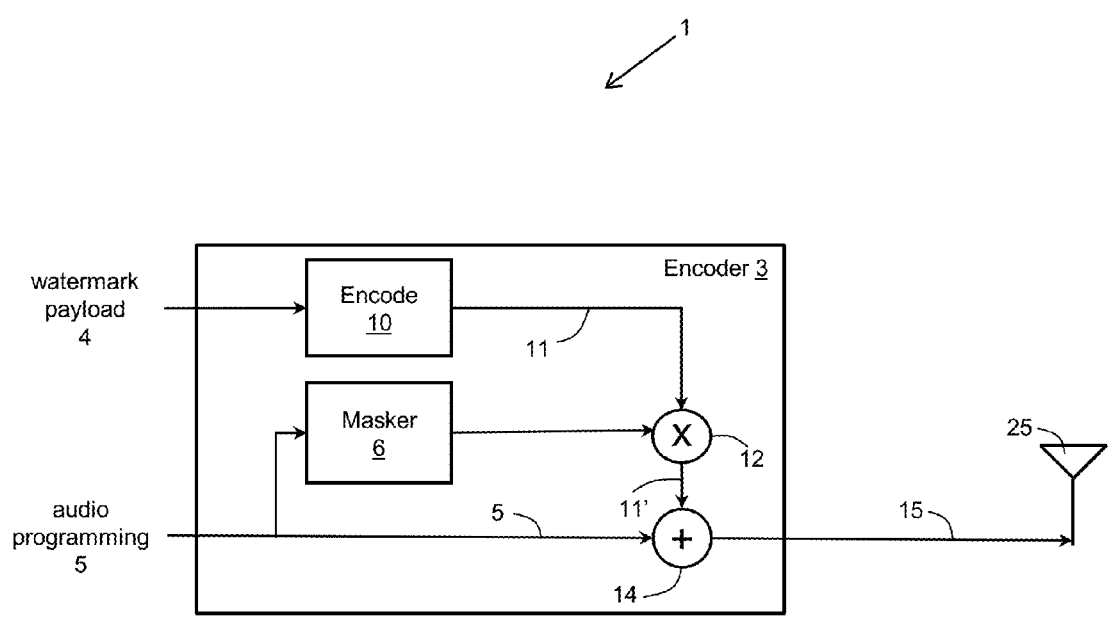
FIG. 1 illustrates a simplified block diagram of an exemplary system for electronic watermarking.

FIG. 1 illustrates a simplified block diagram of an exemplary system 1 for electronic watermarking. The main component of the watermarking system 1 is the encoder 3, which includes the masker 6 and the watermarking encode 10. The encode 10 receives the watermark payload 4 including, for example, a radio station identification, the time of day, etc. and encodes it to produce the watermark signal 11. The encode 10 encodes this information in possibly an analog signal that will be added to the audio programming 5 someplace in the transmitter chain.

But the amount of watermarking that can be injected varies because the degree of masking depends on the programming 5, which may include, announcers, soft-jazz, hard-rock, classical music, sporting events, etc. Each audio source has its own distribution of energy in the time-frequency space and that distribution controls the amount of watermarking that can be injected at a tolerable level. The masking analysis process has embedded numerous parameters, which need to be optimized. The masker 6 receives the audio programming signal 5 and analyses it to determine, for example, the timing and energy at which the watermark signal 11 will be broadcasted. The masker 6 may take advantage of perceptual masking of the audio signal 5 to hide the watermark.

The output of the masker 6 is provided to the multiplier 12 and its output is the adjusted watermarking signal 11'. The summer 14 receives the audio programming signal 5 and embeds the adjusted watermarking signal 11' onto the audio programming signal 5. The result is the output signal 15, which includes the information in the audio programming signal 5 and the adjusted watermarking signal 11'. The modulator/transmitter 25 at the station broadcasts the transmission, which includes the information in the output signal 15, through the air, internet, satellite, etc.

In the field (not shown) an AM/FM radio, television, etc. that includes a receiver, a demodulator, and a speaker receives, demodulates and reproduces the output signal 15. A decoder receives and decodes the received signal to, hopefully, obtain the watermark or the information within the watermark. The decoder, which has the responsibility of extracting the watermarking payload, is faced with the challenge of operating in an environment where both the local sounds and the program being transmitted may undermine the performance of the decoder. Moreover, if the energy of the audio signal at the determined temporal portion in which the watermark was inserted is relatively high at the frequency band in which the watermark symbol was encoded, this may further impair the ability of the decoder to effectively decode the watermark.

Figure 2:
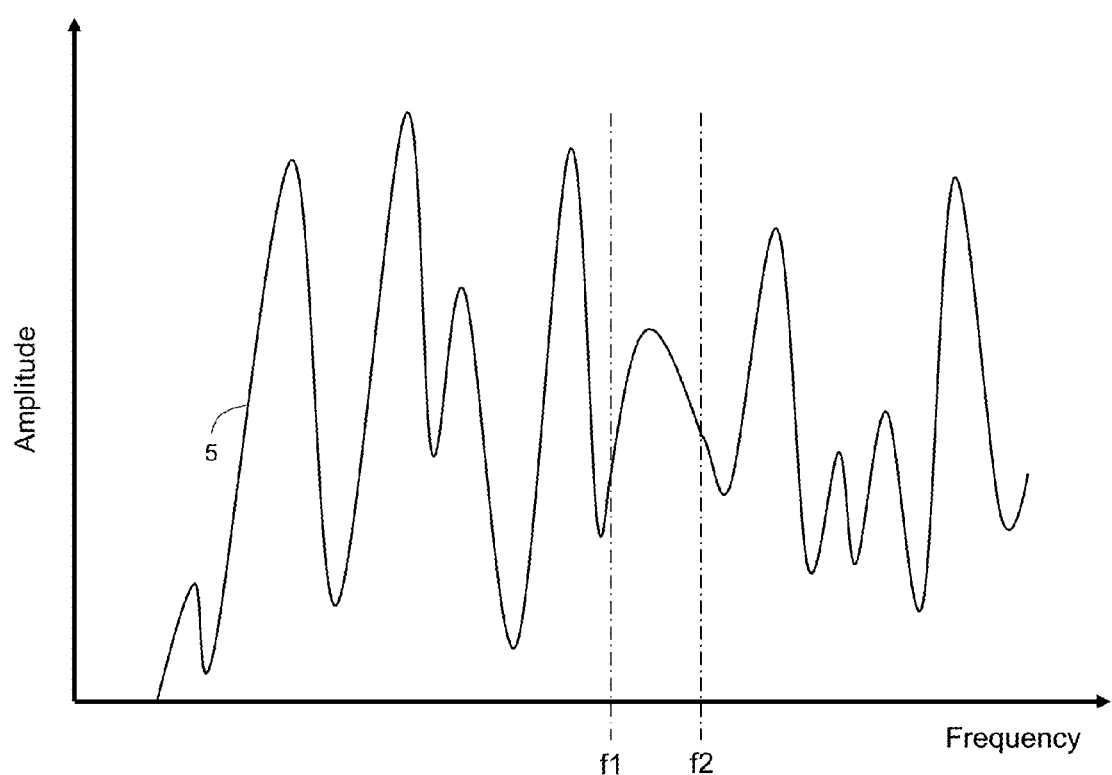
FIG. 2 illustrates an exemplary frequency domain representation of an audio signal at the time selected for insertion of the watermark.

FIG. 2 illustrates an exemplary frequency domain representation of an audio signal at the time that the masker 6 of FIG. 1 has selected for insertion of the watermark. The frequency band in which the watermark is to be inserted is the band between the frequencies f1 and f2. Notice, however, that energy in the frequency band between the frequencies f1 and f2 is relatively high. Inserting the watermark in the frequency band between the frequencies f1 and f2, with its relatively high energy of the audio signal, may impair the ability of the decoder to later effectively decode the watermark. The audio signal may have too much energy in the frequency band between the frequencies f1 and f2 for energy corresponding to the watermark, once inserted in the frequency band, to be detected effectively.

Figure 3:
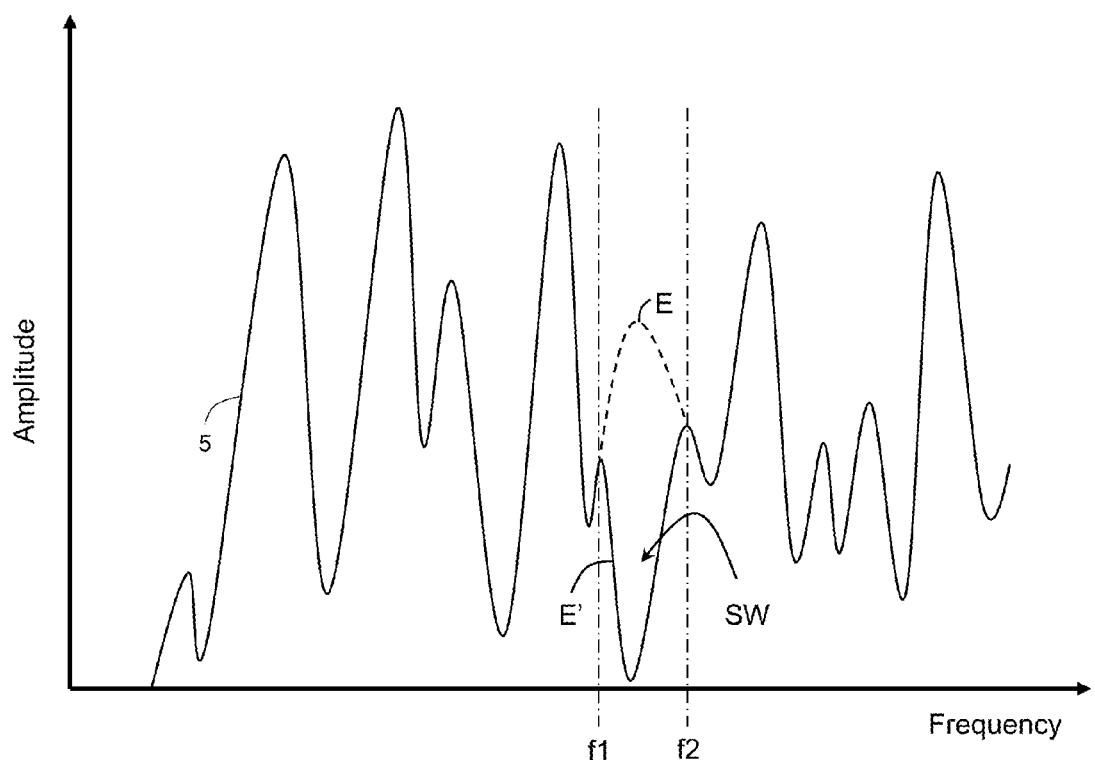
FIG. 3 illustrates an exemplary frequency domain representation of the audio signal at the time selected for insertion of the watermark.

FIG. 3 illustrates an exemplary frequency domain representation of the audio signal at the time selected for insertion of the watermark. In FIG. 3, in contrast with FIG. 2, a spectral well SW has been created in the frequency band between the frequencies f1 and f2. The curve labeled E and shown dashed corresponds to that of FIG. 2 above, the curve prior to the creation of the spectral well SW. The curve labeled E' and shown solid corresponds to the new curve in which the spectral well SW has been created. The spectral well SW corresponds to a reduction or attenuation of energy of the audio signal created in the frequency band between the frequencies f1 and f2 at the time determined for insertion of the watermark. In FIG. 3, a portion of the audio signal corresponding to the frequency range between the frequencies f1 and f2 has been removed. The shape of the spectral well SW of FIG. 3 is only exemplary. Spectral wells may have shapes different from that shown in FIG. 3.

Inserting the watermark in the frequency band between the frequencies f1 and f2 with its now-reduced energy level of the audio signal may increase the ability of the decoder to later effectively decode the watermark. There is not as much energy of the audio signal in the frequency band between the frequencies f1 and f2 now. The chances for detection of the watermark, once inserted in the frequency band between f1 and f2, have increased from the curve of FIG. 2 to the curve of FIG. 3.

In one embodiment, a determination may be made as to whether to create a spectral well based on, for example, amplitude of the audio signal or a signal-to-noise ratio (S/N) of the watermark signal to the audio signal at the spectral and temporal location where the watermark is to be inserted. In other embodiments, a determination may be made as to the depth of the spectral well based on similar considerations (i.e., amplitude of the audio signal or S/N of the watermark signal to the audio signal). In one embodiment, the masking algorithm of the masker 6 plays a role in such determinations as to whether to create the spectral well or as to the depth of the spectral well.

Figure 4:
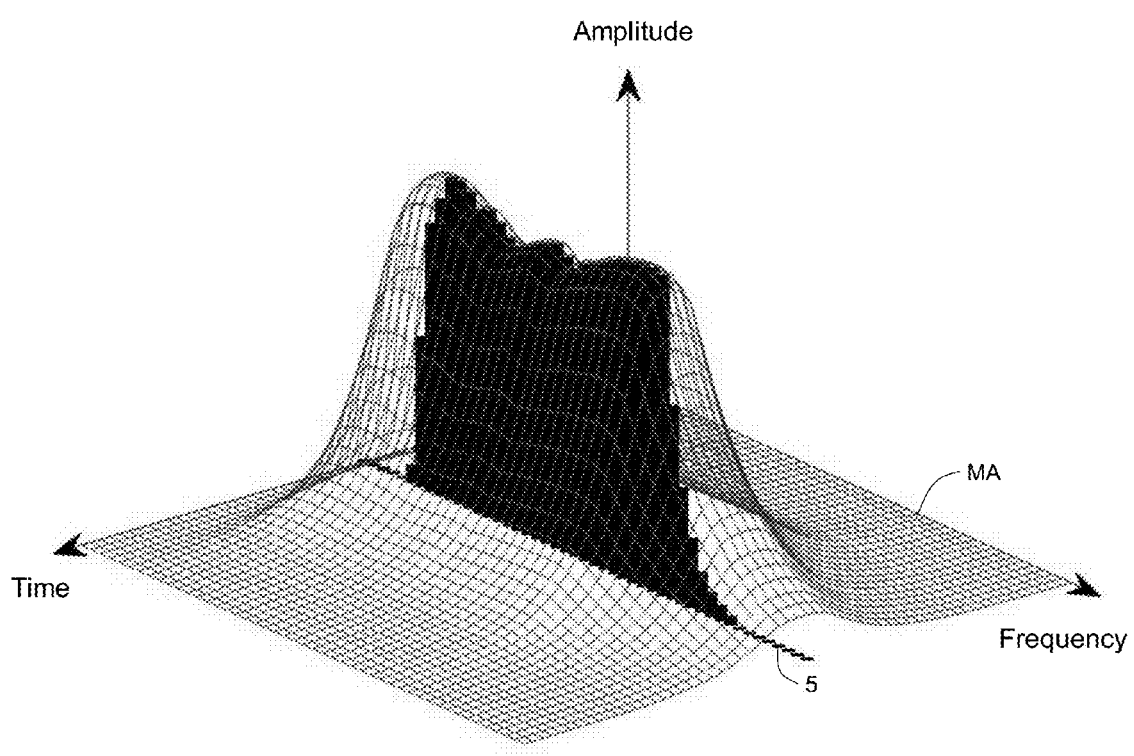
FIG. 4 illustrates an exemplary relationship between time-frequency spectra of a program's audio signal and a corresponding masking algorithm.

FIG. 4 illustrates an exemplary relationship between time-frequency spectra of a program's audio signal 5 and a corresponding masking algorithm MA. The figure shows a hypothetical segment of audio 5 as a vertical block of energy and a hashed masking envelope MA below which other audio components are inaudible. Under the envelope MA, other audio components at the appropriate time and frequency will be inaudible. The program's audio signal 5 is represented as the vertical rectangular block with a well-defined start and stop time, as well as a high and low frequency. The corresponding masking curve MA in the same time-frequency representation determines the maximum added watermark energy that will not be audible.

Masking is represented by the envelope grid MA, under which the human ear cannot detect a signal.

Figure 5:
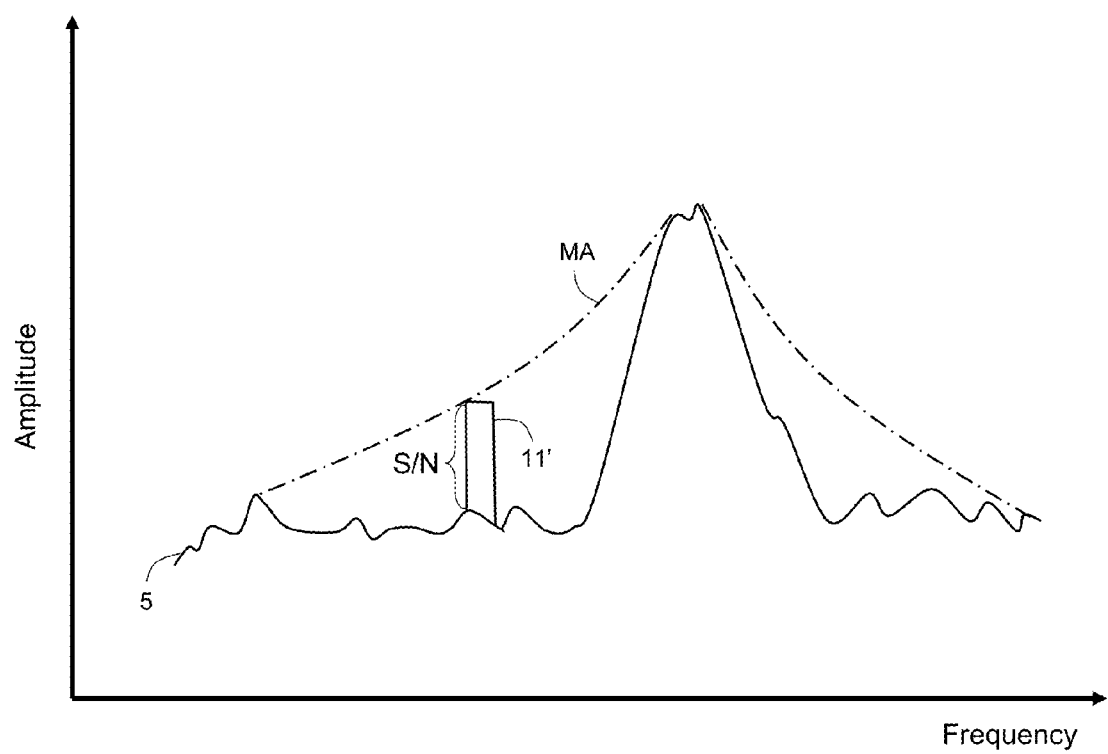
FIG. 5 illustrates an exemplary frequency domain representation of the audio signal at the time selected for insertion of the watermark and how the effective S/N of the watermark signal may be determined.

FIG. 5 illustrates an exemplary frequency domain representation of the audio signal 5 at the time selected for insertion of the watermark and how the effective S/N of the watermark signal 11' may be determined. The maximum level of the watermark signal 11' injectable at a time-frequency is determined by the masker 6 based on the masking algorithm, while the "noise" in the S/N corresponds to the energy of the program's audio signal 5 at the same time-frequency. The energy of the program's audio signal 5 both enables the watermark 11' to be injected and it also degrades the watermark 11' with additive "noise."

Figure 6:
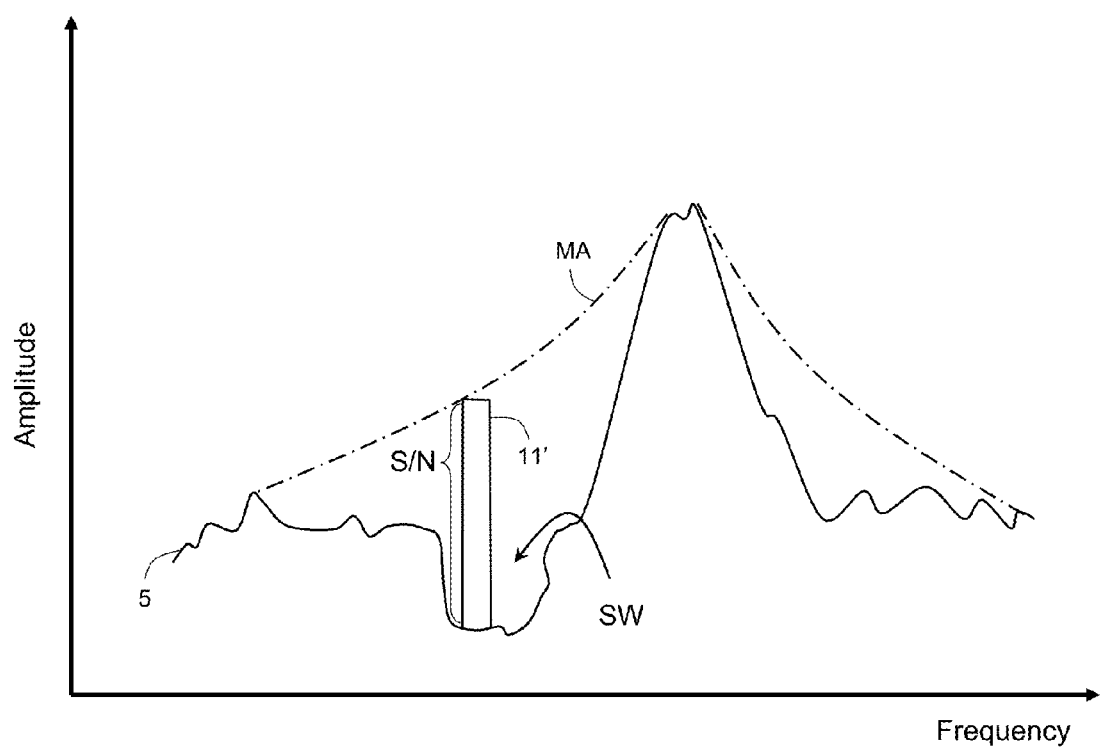
FIG. 6 illustrates an exemplary frequency domain representation of the audio signal at the time selected for insertion of the watermark and how the creation of a spectral well under the watermarking component increases the S/N of the watermark as seen by the decoder.

FIG. 6 illustrates an exemplary frequency domain representation of the audio signal 5 at the time selected for insertion of the watermark 11' and how the creation of a spectral well SW under the watermarking component increases the S/N of the watermark as seen by the decoder. If the needed S/N is achieved without creating or enhancing a spectral well, the extra spectral well may not need to be created. However, if the S/N is not adequate, for example 3 dB, a spectral well of, for example, an additional 3 dB may be created to get to an adequate S/N of, for example, 6 dB. Thus, a threshold or target S/N may control the creation of the spectral well on an as needed basis with the required depth to achieve the target S/N.

Figure 7:
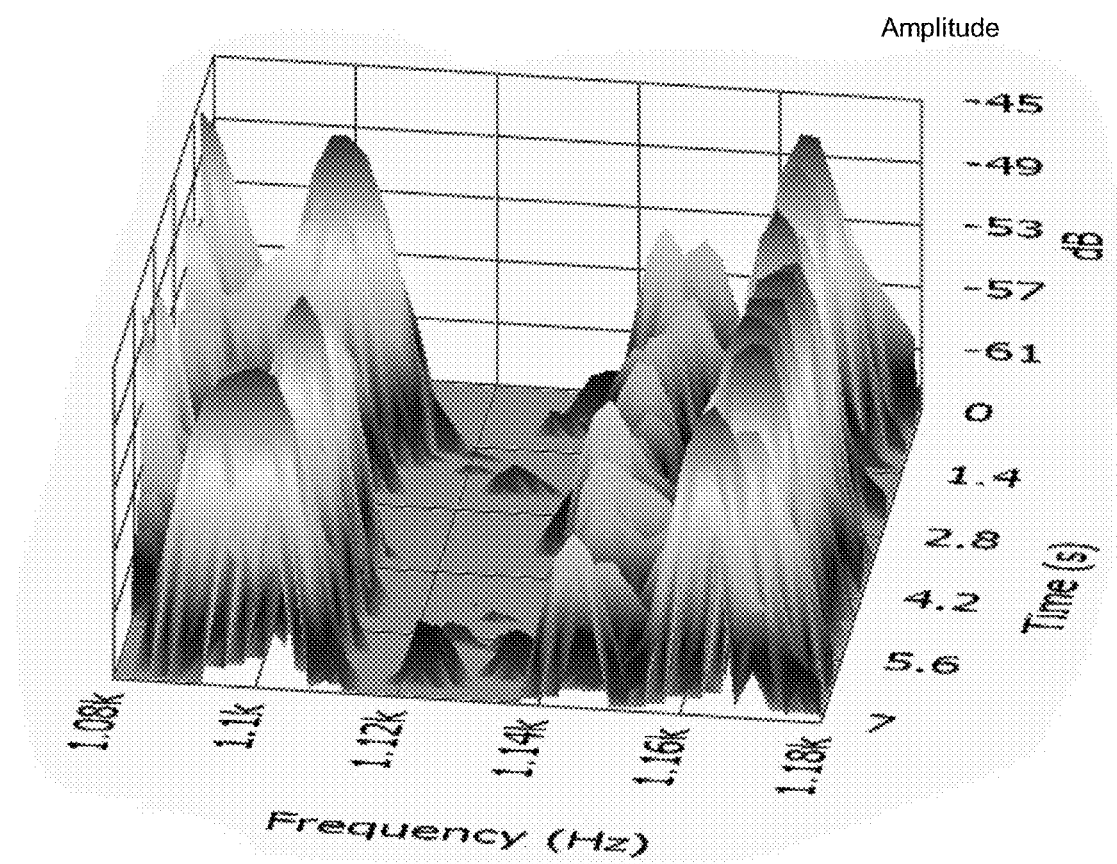
FIG. 7 illustrates a typical segment of music, in this case an organ solo, with a natural spectral well that requires no additional processing.

FIG. 7 illustrates a typical segment of music, in this case an organ solo, with a natural spectral well that requires no additional processing. The spectral region between 1.15 kHz and 1.14 kHz, which is between two overtones of the organ note, is an ideal natural spectral well that is part of this piece of music.

Figure 8:
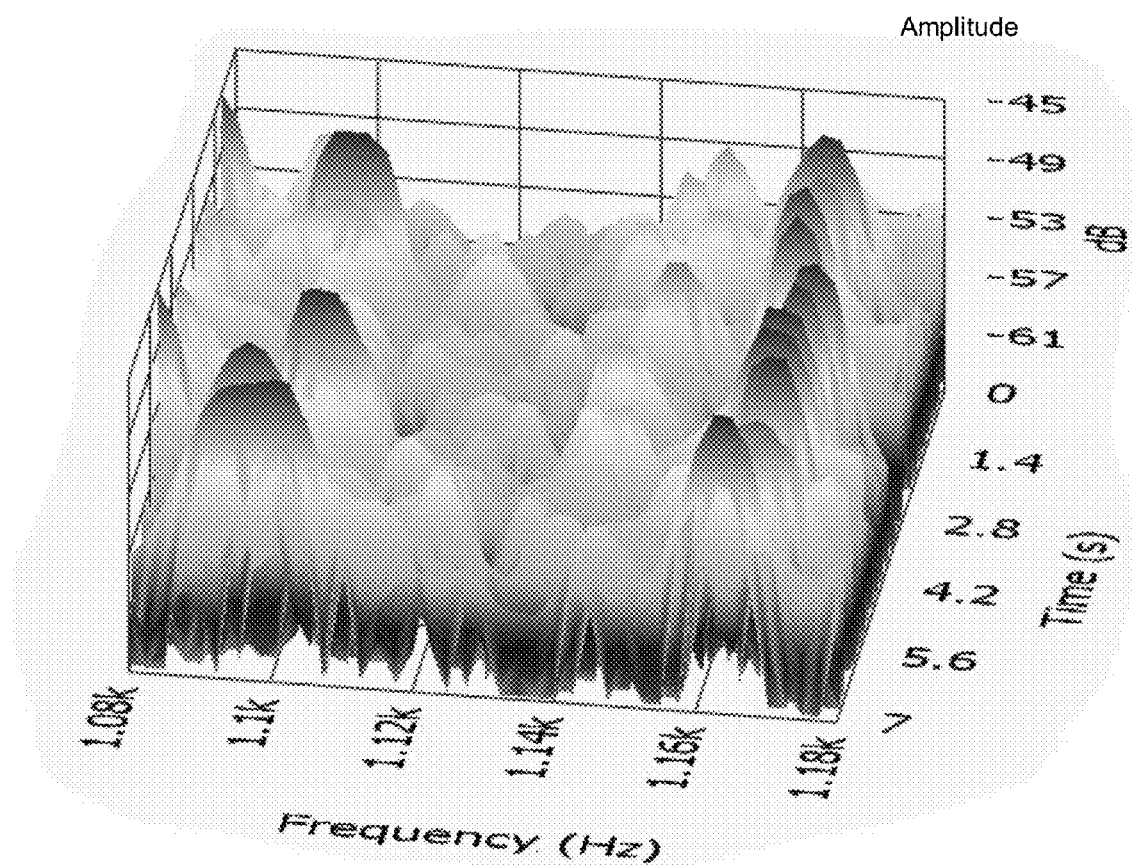
FIG. 8 illustrates an exemplary piece of music, in this case the same organ note of FIG. 7 but with an accompanying orchestra that fills in the spectral well.

FIG. 8 illustrates a more typical piece of music, in this case the same organ note but with an accompanying orchestra that fills in the spectral well. Without additional processing, the S/N of the watermark would be insufficient for the decoder to detect or decode the watermark signal even though the watermark signal's peak energy is the same as that for FIG. 7.

Figure 9:
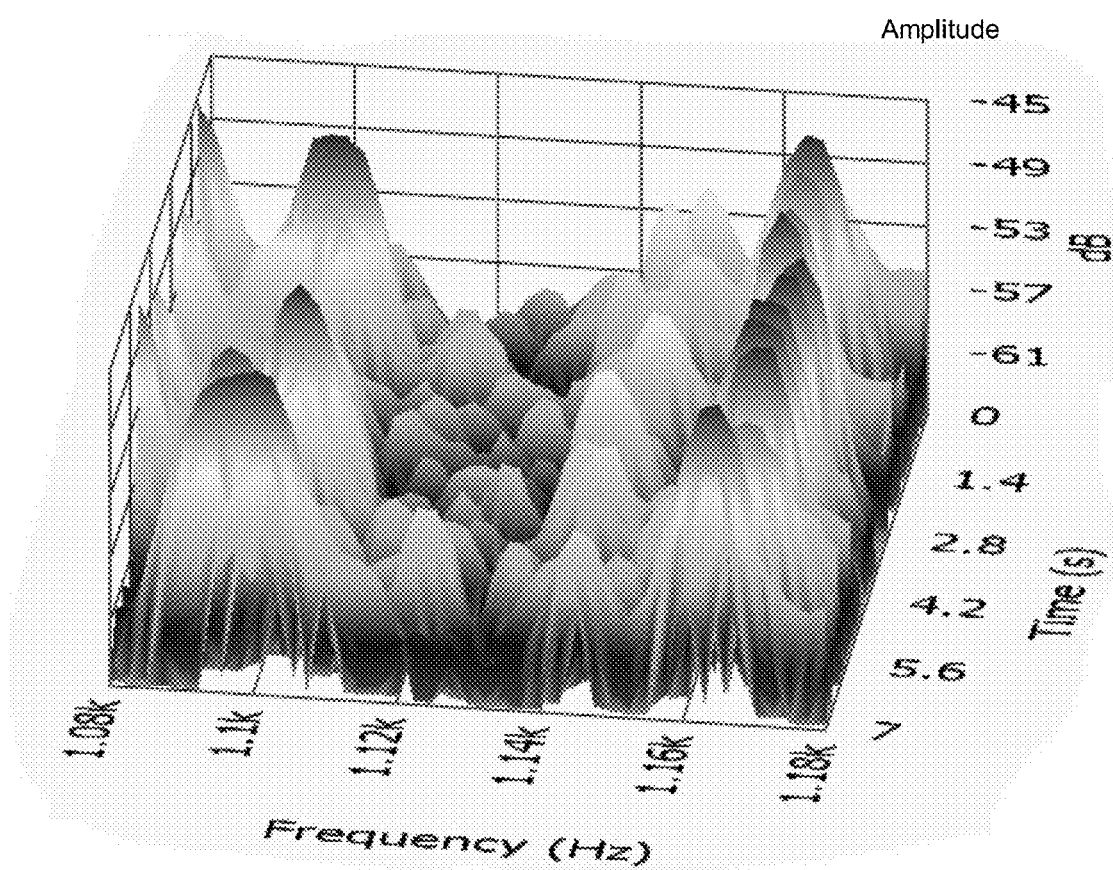
FIG. 9 illustrates the time-frequency spectrum of FIG. 8 but with additional spectral well processing.

FIG. 9 illustrates the time-frequency spectrum of FIG. 8 but with the additional spectral well processing. The S/N of the watermarking for this case is more than 6 dB. The spectral well could be made deeper and eventually could approach the time-frequency spectrum of FIG. 7.

Figure 10:
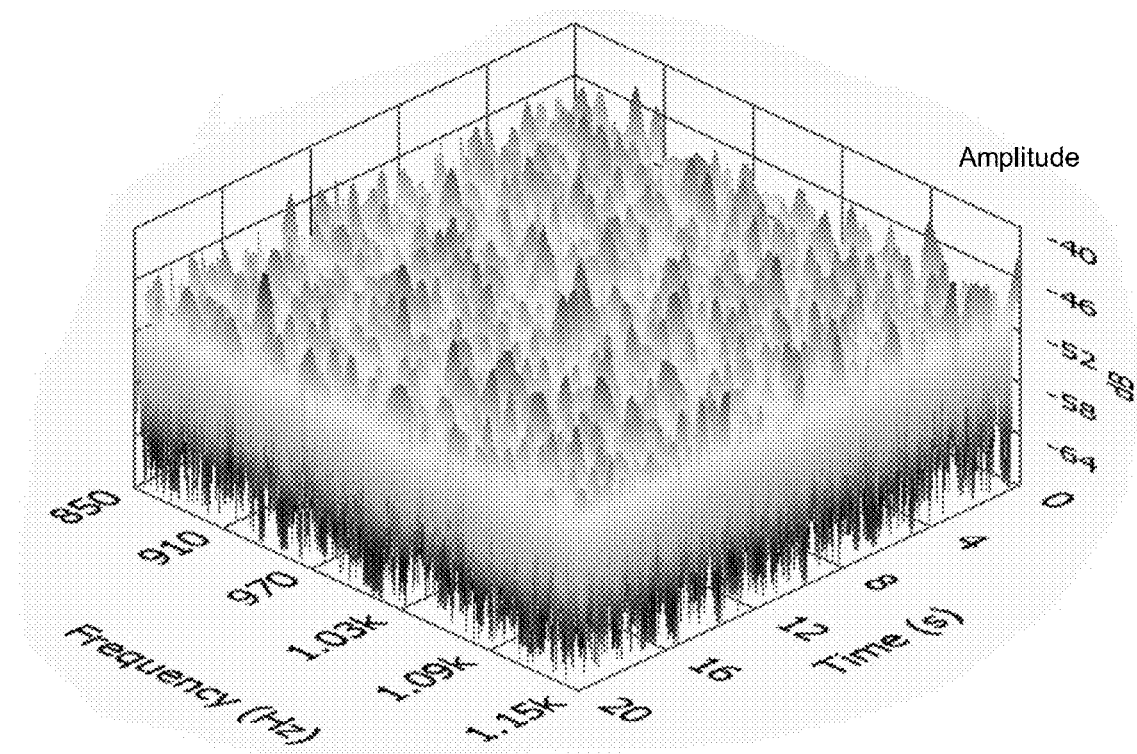
FIG. 10 illustrates a time-frequency spectrum of a music segment with no natural spectral wells.

FIG. 10 illustrates a time-frequency spectrum of a music segment with no natural spectral wells. If watermarking has to be injected, the spectral well needs to be created.

Figure 11:
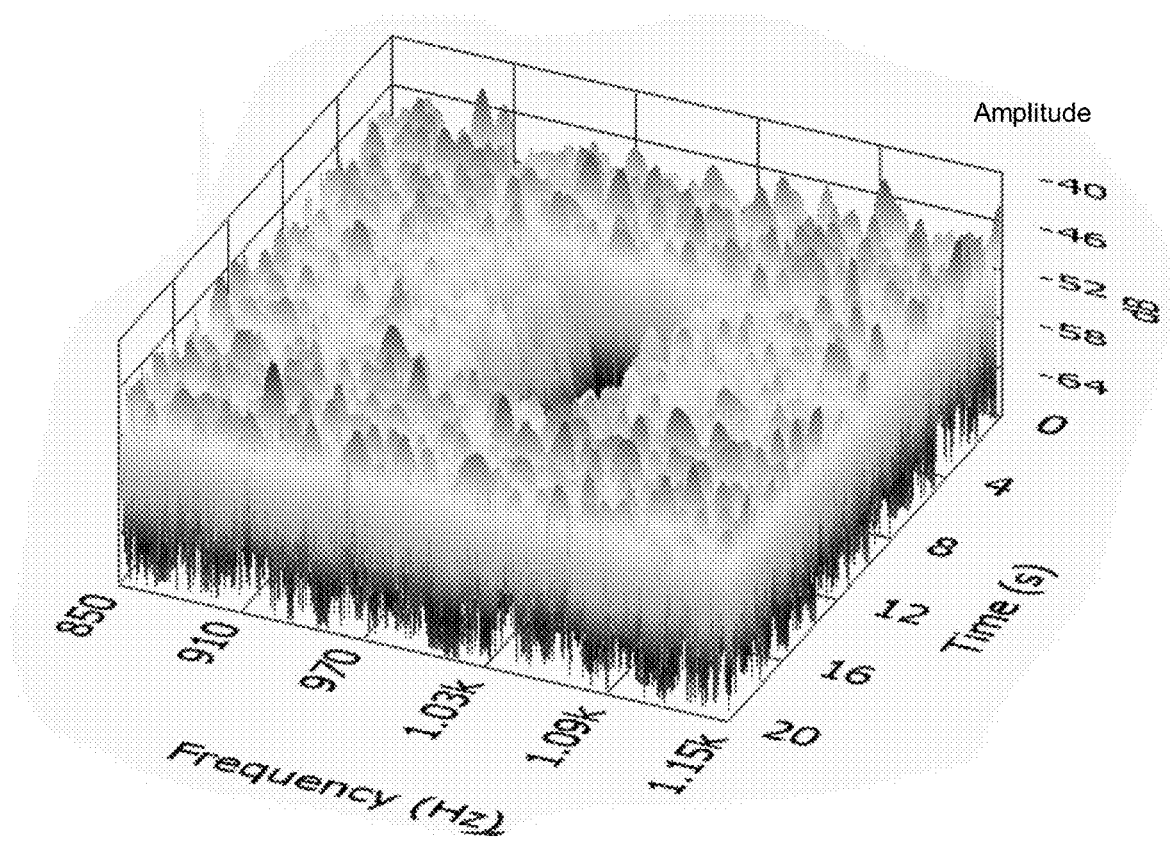
FIG. 11 illustrates the spectrum of FIG. 10 after a spectral well has been created between 5 and 10 seconds and between 0.99 kHz and 1.05 kHz.

FIG. 11 illustrates the spectrum of FIG. 10 after a spectral well has been created between 5 and 10 seconds and between 0.99 kHz and 1.05 kHz.

Figure 12:
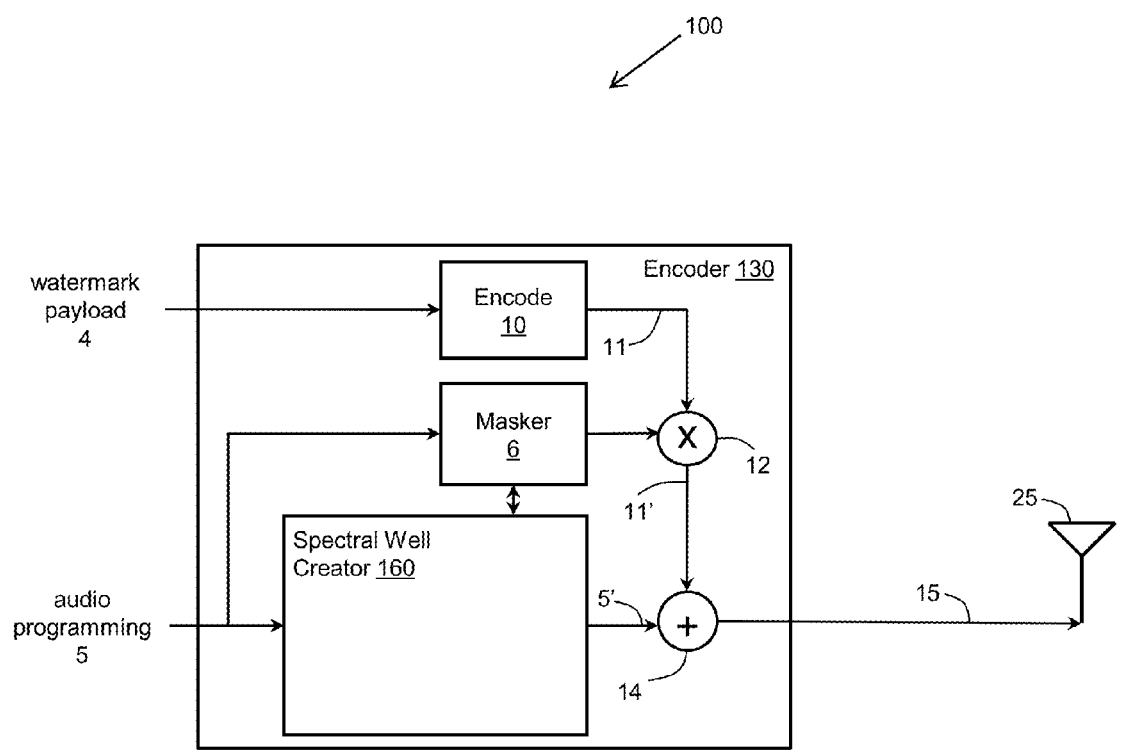
FIG. 12 illustrates a simplified block diagram of an exemplary system for electronic watermarking.

FIG. 12 illustrates a simplified block diagram of an exemplary system 100 for electronic watermarking. The system 100 includes the encoder 130, which includes the masker 6 and the watermarking encode 10. The encode 10, as in FIG. 1, receives the watermark payload 4 including, for example, a radio station identification, the time of day, etc. and encodes it to produce the watermark signal 11. The encode 10 encodes this information in possibly an analog signal that will be added to the audio programming 5 someplace in the transmitter chain. The encode 10 may also modify the watermark signal (watermark modifier) to modulate the watermark signal with a carrier frequency in the frequency range at which the watermark is to be embedded onto the audio programming signal 5. The masker 6 receives the audio programming signal 5 and analyses it to determine, for example, the timing and energy at which the watermark signal 11 will be broadcasted. The masker 6 may take advantage of perceptual masking of the host audio signal 5 to hide the watermark. The output of the masker 6 is provided to the multiplier 12 and its output is the adjusted watermarking signal 11'.

The encoder 130 also includes spectral well creator 160 that receives the audio programming signal 5 and creates a spectral well on the audio signal 5 by removing a portion of the audio signal 5 corresponding to a frequency range of the audio signal 5. The spectral well creator 160 may receive information from the masker 6 as to the timing and/or frequency band of the audio signal 5 that the masker 6 has selected for insertion of the adjusted watermarking signal 11'. Based on that information, the spectral well creator 160 may create a spectral well at the time and/or frequency band of the audio signal 5 resulting on a modified audio signal 5'.

The summer or watermark inserter 14 receives the modified audio signal 5' and embeds the adjusted watermarking signal 11' onto the modified audio signal 5'. The watermark signal 11' is effectively embedded in the spectral well by the watermark inserter 14 superimposing the adjusted watermark signal 11' onto the audio signal 5'. The result is the output signal 15, which includes the information in the audio programming signal 5' and the adjusted watermarking signal 11'. The modulator/transmitter 25 at the station broadcasts the transmission, which includes the information in the output signal 15, through the air, internet, satellite, etc.

In the field (not shown) an AM/FM radio, television, etc. that includes a receiver, a demodulator, and a speaker may receive, demodulate and reproduce the output signal 15. A decoder may receive and decode the reproduced signal to, hopefully, obtain the watermark or the information within the watermark. However, since the S/N of the watermark signal 11' has been significantly increased due to the creation of the spectral well on the audio signal 5', the chances of the watermark being detected have increased.

Figure 13:
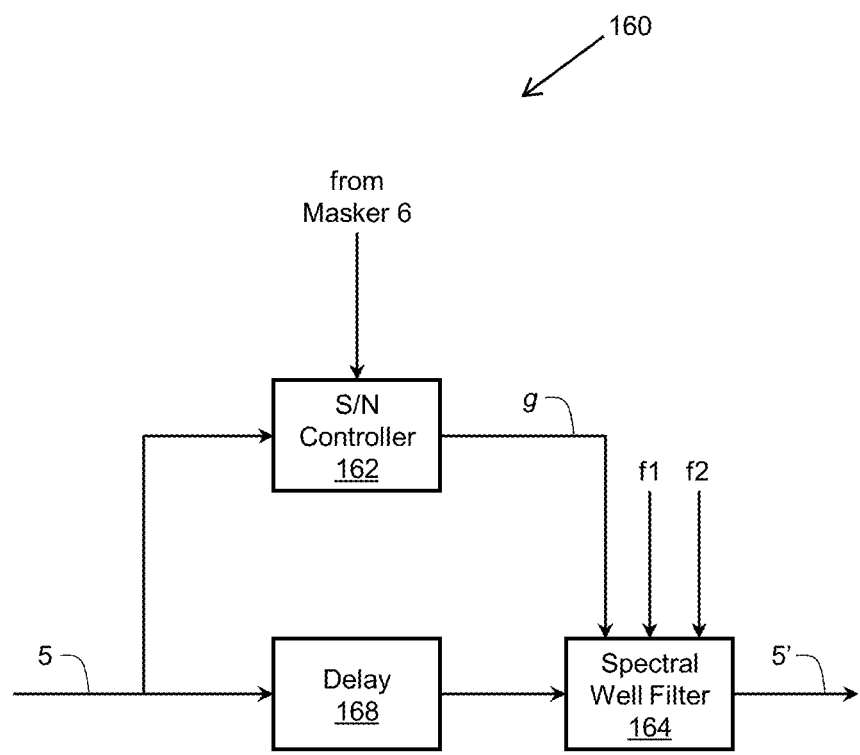
FIG. 13 illustrates a block diagram of an exemplary spectral well creator.

FIG. 13 illustrates a block diagram of an exemplary spectral well creator 160, which includes an S/N controller 162 that receives the audio signal 5 and an indication of the amplitude of the watermark signal 11' from the masker 6. Prior to the spectral well creator 160 creating the spectral well on the audio signal 5, the S/N controller 162 determines the S/N of the watermark signal 11' to the audio signal 5 corresponding to the time and frequency range where the watermark is to be inserted. In one embodiment, the S/N controller 162 resides within the spectral well creator 160 as shown in FIG. 13. In another embodiment, the spectral well creator 160 and the S/N controller 162 may receive information from the masker 6 indicative of the amplitude of the portion of the audio signal 5 corresponding to the time and frequency range where the watermark is to be inserted. The S/N controller 162 may include a volt meter, group of voltmeters or similar structure that determines (e.g., measures) the amplitude of the watermark signal 11' and the audio signal 5 and compares them.

In the illustrated embodiment of FIG. 13, the spectral well creator 160 includes a spectral well filter 164 with a start and ending frequencies (for example, f1 and f2 of FIG. 3), which may be fixed or dynamically selected. The lower (f1) and upper (f2) frequencies may correspond to frequencies that define the frequency band in which the watermark is to be inserted. The audio signal 5 may be passed through the filter 164 at the time of the audio signal 5 that the watermark is to be inserted. This creates the spectral well on the audio signal 5' by removing the portion of the audio signal 5 corresponding to the time and frequency range of the audio signal 5 where the watermark is to be inserted.

Figure 14:
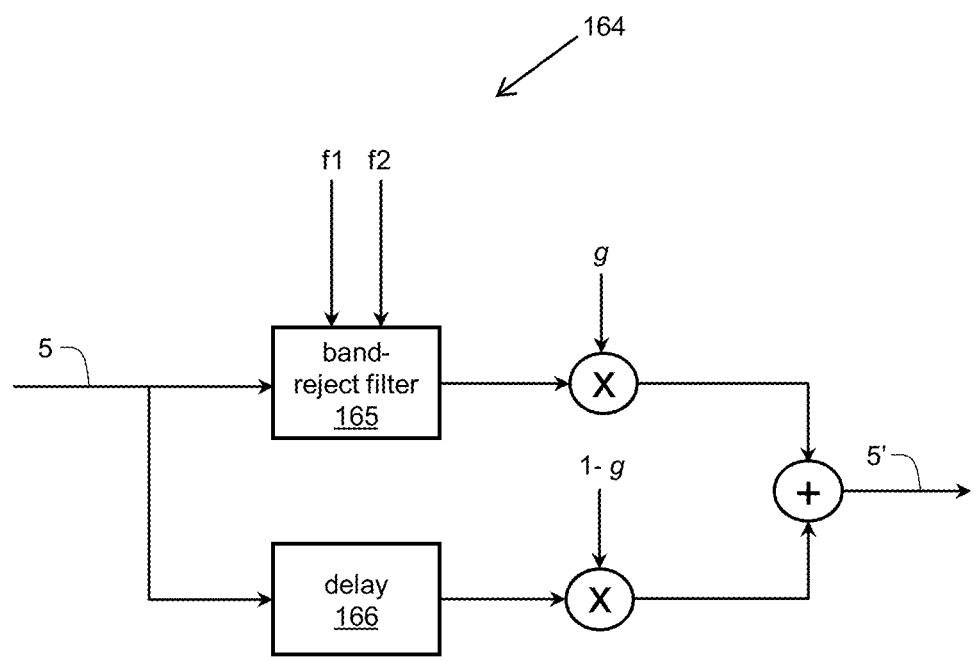
FIG. 14 illustrates a block diagram of an exemplary implementation of a spectral well filter.

FIG. 14 illustrates a block diagram of an exemplary implementation of the spectral well filter 164, which includes a band-stop or band-reject filter 165. Assuming that the filter 165 was implemented with an FIR architecture having fixed delay at all frequencies, the depth of the spectral well is determined by constant g, which is a cross fading between g=0 (no well) and g=1 (maximum well depth). The filter 164 may include an extra delay 166 that introduces a delay equal (or roughly equal) to the known, fixed delay of the filter 165. Since the delays in the filter 165 and the extra delay 166 are the same (or approximately the same), cross fading has no phase issues. In another embodiment, a single filter can be used with dynamic control of depth.

Returning to FIG. 13, in the illustrated embodiment, the spectral well creator 160 includes a look ahead delay 168 that is used so that the spectral well creator 160 may operate as a predictor. That is, the S/N controller 162 may make decisions as to whether to create the spectral well or as to the depth of the spectral well on the basis of audio yet to arrive to the filter 164.

Thus, in one embodiment, based on the information regarding the amplitude of the portion of the audio signal 5 corresponding to the time and frequency range where the watermark is to be inserted, the S/N controller 162 (and thus the spectral well creator 160) may make decisions as to whether to create the spectral well on the audio signal 5. For example, if the amplitude of the portion of the audio signal corresponding to the time and frequency range where the watermark is to be inserted exceeds a certain threshold, the S/N controller 162 (and thus the spectral well creator 160) may proceed with creating the spectral well. If the amplitude of the portion of the audio signal corresponding to the time and frequency range where the watermark is to be inserted does not exceed the threshold, the S/N controller 162 (and thus the spectral well creator 160) may skip creating the spectral well. It may be that energy of the audio signal 5 at the time and frequency range where the watermark is to be inserted is already low enough that creation of the spectral well would not provide sufficient, measurable or justifiable improvements in detectability.

The embodiment of FIG. 13 is merely exemplary and there are any number of embodiments that may vary based on the application needs, some of which will be explained below.

In one embodiment, the S/N controller 162 looks at the incoming audio program signal 5 and determines the degree to which each of the watermarking channels has a natural spectral well as discussed above. That is, the S/N controller 162 determines the amplitude of the audio signal 5 and then, based on the watermarking amplitude that fits under the masking curve as received from the masker 6, calculates the resulting S/N. If that ratio is adequate (i.e., above a threshold), no well may need to be created. If not adequate (i.e., below a threshold), the S/N controller 162 determines the depth of the spectral well to achieve the threshold or target S/N. The program energy being removed to create the spectral well is not audible since the well is also under the masking curve.

An audio program may be sufficiently uniform in time and frequency that there are no dominant components to produce masking. In this case, adding watermarking or creating a spectral well are likely to be audible. However, if the energy removed by the spectral well and the energy added by the watermarking are approximately equal and if the well duration is approximately the same as the watermark duration, the net effect in audibility is minimal. In one embodiment, the S/N controller 162 replaces a piece of program audio signal with a similar watermark piece. Ideally, the watermarked audio will sound equivalent to the original but the watermark has enough structure to be decoded. This is perceptual equivalence but not detection equivalence.

Thus, in one embodiment, the spectral well creator 160 and the masker 6 communicate and work in concert such that amplitude of the adjusted watermark signal 11' (see, for example, FIG. 3) approximates the amplitude of the portion of the audio signal 5 removed by the spectral well creator 160 to create the spectral well in modified audio signal 5'. For example, the S/N controller 162 may determine amplitude of the portion of the audio signal 5 corresponding to the time and frequency range at which the watermark is to be inserted. The masker 6 may then, in combination with multiplier 12, modify (i.e., amplify or attenuate) the watermark signal 11 such that amplitude of the watermark signal 11' approximates the amplitude of the portion of the audio signal 5 removed by the spectral well creator 160 to create the spectral well in the modified audio 5'.

The result of this modification is that the resulting output audio signal 15 will resemble or look similar to the original audio signal 5 because the watermark signal 11' (having an amplitude that approximates the amplitude of the portion of the audio signal 5 removed by the spectral well creator 160) takes the place of the removed portion. In the examples of FIGS. 2 and 3 above, where FIG. 3 illustrates the created spectral well SW, the audio signal 15 will resemble or look similar to the original audio signal of FIG. 2.

A typical watermarking system might have redundancy in that the same watermarking information may appear in separate frequency channels. In such a system, each channel may have a separate S/N computation. The degree to which the creation of a spectral well needs to be aggressive depends on how many channels have an acceptable S/N both currently and in the recent past. The controller may understand how much is needed if it has a model of the watermarking redundancy. For example, if there are 10 watermark channels spread over 1 to 3 kHz, and if 5 of those channels have good S/N, the system may ignore modifying spectral wells on the other 5 channels.

Figure 15:
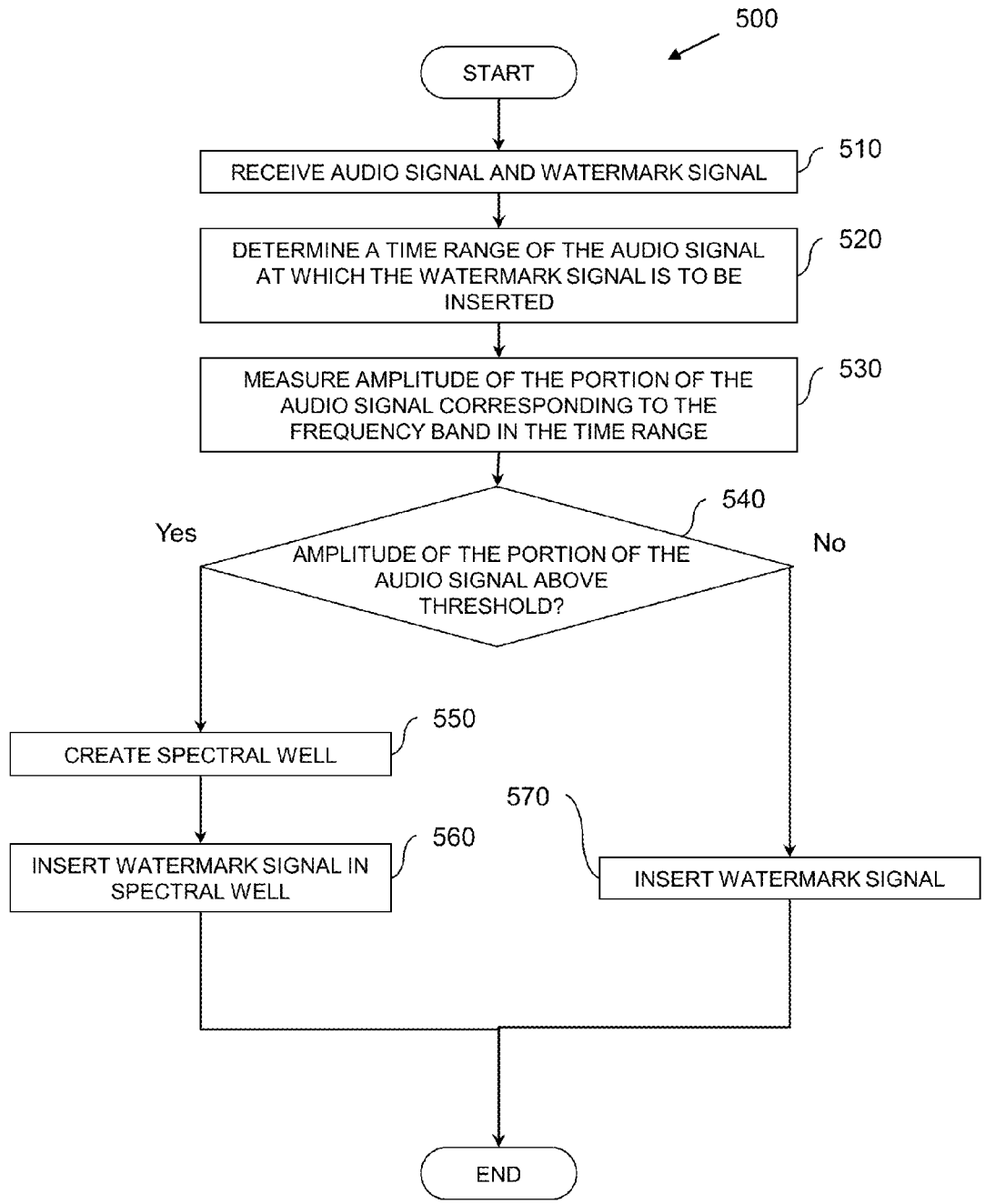
FIG. 15 illustrates a flow diagram for an example method for a machine or group of machines to watermark an audio signal.

Example methods may be better appreciated with reference to the flow diagram of FIG. 15. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an example methodology. Furthermore, additional methodologies, alternative methodologies, or both can employ additional blocks, not illustrated.

In the flow diagram, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

FIG. 15 illustrates a flow diagram for an example method 500 for a machine or group of machines to watermark an audio signal. At 510 the method 500 includes receiving an audio signal and a watermark signal. At 520, the method 500 determines a time range of the audio signal at which the watermark signal is to be inserted. The watermark encoding method may take advantage of perceptual masking of the host audio signal to hide the watermark and thus may determine the time range based on perceptual masking capability of the audio signal, for example.

At 530, the method 500 includes measuring the amplitude of a portion of the audio signal corresponding to the frequency band and the time range determined for the watermark to be inserted in the audio signal.

At 540, if the amplitude of the portion of the audio signal corresponding to the frequency band and the time range determined for the watermark to be inserted in the audio signal is higher than a threshold, at 550, the method 500 creates a spectral well as disclosed above. At 560, the method 500 inserts the watermark signal in the spectral well.

On the other hand, at 540, if the amplitude of the portion of the audio signal corresponding to the frequency band and the time range determined for the watermark to be inserted in the audio signal is not higher than the threshold, at 570, the method 500 inserts the watermark signal in the audio signal without creating a spectral well.

In one embodiment, the method 500 includes measuring the S/N of the watermarking signal to the audio signal corresponding to the frequency band and the time range determined for the watermark to be inserted in the audio signal. If the S/N is lower than a threshold, the method 500 creates a spectral well as disclosed above. On the other hand, if the S/N is at or higher than the threshold, the method 500 inserts the watermark signal in the audio signal without creating a spectral well.

In some embodiments, the method 500 may modify the amplitude of the watermark signal such that it approximates the amplitude of the portion of the audio signal removed to create the spectral well. The result of this is that the resulting output audio signal will resemble or look similar to the original audio signal because the watermark signal (having an amplitude that approximates the amplitude of the portion of the audio signal removed to create the spectral well) takes the place of the removed portion.

While FIG. 15 illustrates various actions occurring in serial, it is to be appreciated that various actions illustrated could occur substantially in parallel, and while actions may be shown occurring in parallel, it is to be appreciated that these actions could occur substantially in series. While a number of processes are described in relation to the illustrated methods, it is to be appreciated that a greater or lesser number of processes could be employed and that lightweight processes, regular processes, threads, and other approaches could be employed. It is to be appreciated that other example methods may, in some cases, also include actions that occur substantially in parallel. The illustrated exemplary methods and other embodiments may operate in real-time, faster than real-time in a software or hardware or hybrid software/hardware implementation, or slower than real time in a software or hardware or hybrid software/hardware implementation.

Figure 16:
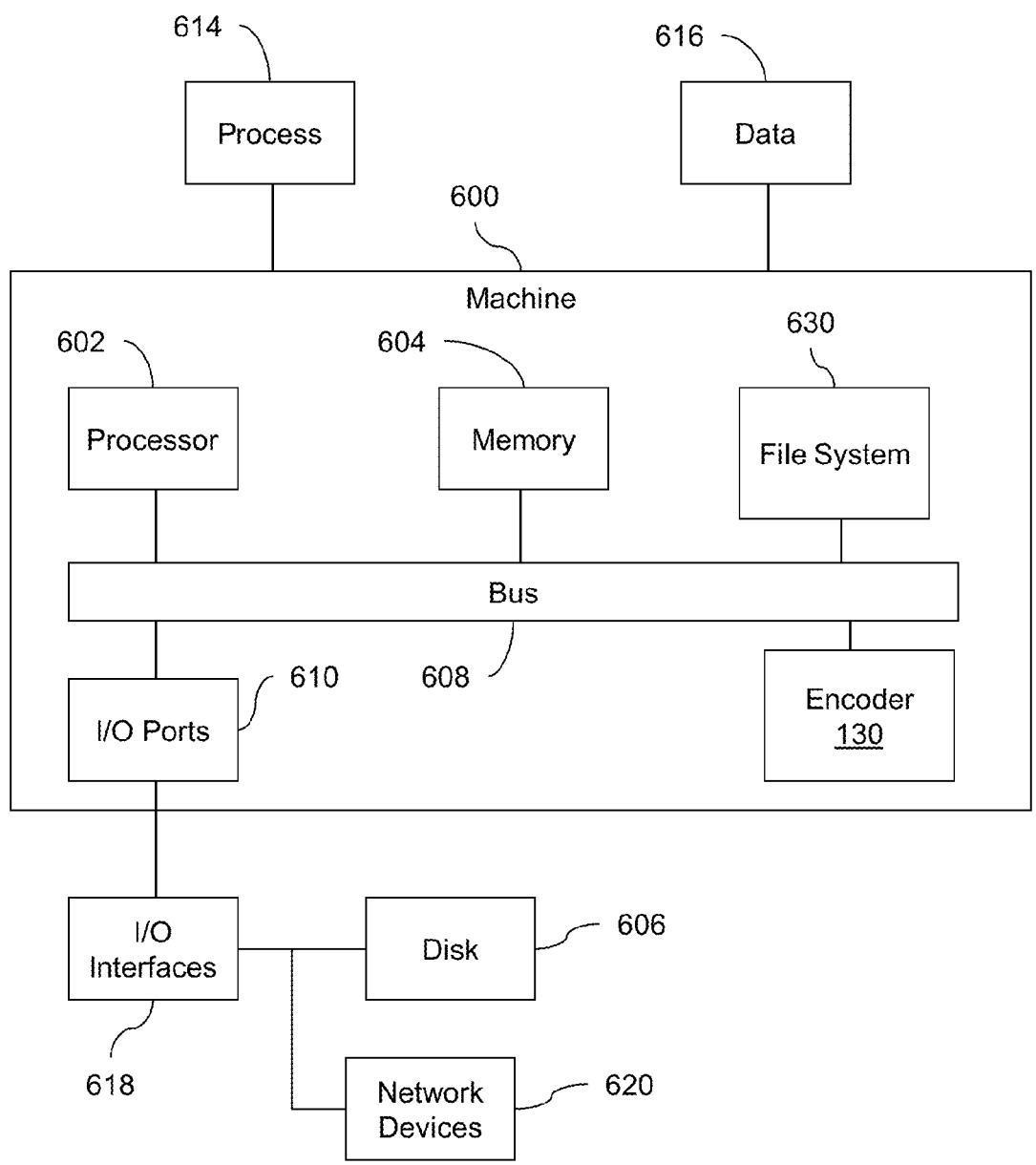
FIG. 16 illustrates a block diagram of an exemplary machine for watermarking an audio signal.

FIG. 16 illustrates a block diagram of an exemplary machine 600 for watermarking an audio signal. The machine 600 includes a processor 602, a memory 604, and I/O Ports 610 operably connected by a bus 608. In one example, the machine 600 may include the encoder 130 as disclosed above, which may include the encode 10, the multiplier 12, the summer 14, the masker 6, the spectral well creator 160, the S/N controller 162 and the band-stop filter 164. Thus, the encoder 130, whether implemented in machine 600 as hardware, firmware, software, or a combination thereof may provide means for receiving the audio signal, receiving a watermark signal, creating a spectral well on the audio signal by removing a portion of the audio signal corresponding to a frequency range, inserting the watermark signal in the spectral well, determining amplitude of the portion of the audio signal corresponding to the frequency range, determining S/N of the watermarking signal to the audio signal corresponding to the frequency range in which the watermark is to be inserted, implementing a band-stop filter with a center frequency in the frequency range, passing the audio signal through the band-stop filter, amplifying or attenuating the watermark signal such that amplitude of the watermark signal approximates the amplitude of the portion of the audio signal removed to create the spectral well, determining a time range of the audio signal at which the watermark signal is to be inserted during the inserting, creating the spectral well on the audio signal by removing the portion of the audio signal corresponding to the frequency range in the determined time range, modulating of the watermark signal with a carrier frequency in the frequency range to obtain a modulated watermark signal, and superimposing the modulated watermark signal onto the audio signal.

The processor 602 can be a variety of various processors including dual microprocessor and other multi-processor architectures. The memory 604 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the machine 600 via, for example, an I/O Interfaces (e.g., card, device) 618 and an I/O Ports 610. The disk 606 can include, but is not limited to, devices like a magnetic disk drive, a solid state disk drive, a floppy disk drive, a tape drive, a Zip drive, a flash memory card, or a memory stick. Furthermore, the disk 606 can include optical drives like a CD-ROM, a CD recordable drive (CD-R drive), a CD rewriteable drive (CD-RW drive), or a digital video ROM drive (DVD ROM). The memory 604 can store processes 614 or data 616, for example. The disk 606 or memory 604 can store an operating system that controls and allocates resources of the machine 600.

The bus 608 can be a single internal bus interconnect architecture or other bus or mesh architectures. While a single bus is illustrated, it is to be appreciated that machine 600 may communicate with various devices, logics, and peripherals using other busses that are not illustrated (e.g., PCIE, SATA, Infiniband, 1394, USB, Ethernet). The bus 608 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The machine 600 may interact with input/output devices via I/O Interfaces 618 and I/O Ports 610. Input/output devices can include, but are not limited to, a keyboard, a microphone, a pointing and selection device, cameras, video cards, displays, disk 606, network devices 620, and the like. The I/O Ports 610 can include but are not limited to, serial ports, parallel ports, and USB ports.

The machine 600 can operate in a network environment and thus may be connected to network devices 620 via the I/O Interfaces 618, or the I/O Ports 610. Through the network devices 620, the machine 600 may interact with a network. Through the network, the machine 600 may be logically connected to remote computers. The networks with which the machine 600 may interact include, but are not limited to, a local area network (LAN), a wide area network (WAN), and other networks. The network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 620 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

DEFINITIONS

The following includes definitions of selected terms employed herein. The definitions include various examples or forms of components that fall within the scope of a term and that may be used for implementation. The examples are not intended to be limiting. Both singular and plural forms of terms may be within the definitions.

"Data store," as used herein, refers to a physical or logical entity that can store data. A data store may be, for example, a database, a table, a file, a list, a queue, a heap, a memory, a register, and so on. A data store may reside in one logical or physical entity or may be distributed between two or more logical or physical entities.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

"Signal," as used herein, includes but is not limited to one or more electrical or optical signals, analog or digital signals, data, one or more computer or processor instructions, messages, a bit or bit stream, or other means that can be received, transmitted, or detected.

"Software," as used herein, includes but is not limited to, one or more computer or processor instructions that can be read, interpreted, compiled, or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servlet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in serial, parallel, massively parallel and other manners.

Suitable software for implementing the various components of the example systems and methods described herein may be produced using programming languages and tools like Java, Pascal, C#, C++, C, CGI, Perl, SQL, APIs, SDKs, assembly, firmware, microcode, or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User," as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A method for a machine or group of machines to watermark an audio signal, the method comprising:
    receiving the audio signal;
    receiving a watermark signal including symbols to be inserted in predetermined frequency channels, each of the predetermined frequency channels corresponding to a different frequency range of the audio signal;
    determining a ratio of (a) amplitude of a symbol to be inserted in one of the predetermined frequency channels over (b) amplitude of the audio signal corresponding to the one of the predetermined frequency channels;
    when the ratio is below a threshold, creating one or more a spectral wells well on the audio signal by removing one or more portions a portion of the audio signal corresponding to respective one or more of the one of the predetermined frequency channels; and
    inserting the symbols in respective ones of the predetermined frequency channels including a predetermined frequency channel in which a spectral well was created and a predetermined frequency channel in which a spectral well was not created.

2. The method of claim 1, wherein the creating the one or more spectral wells on the audio signal includes:
    implementing a band-stop filter with a center frequency in a frequency range of the respective frequency channel; and
    passing the audio signal through the band-stop filter.

3. The method of claim 1, comprising:
    prior to creating a spectral well, determining amplitude of the audio signal at a frequency range of a frequency channel at which the spectral well is to be created; and
    amplifying or attenuating a symbol to be inserted in the frequency channel such that amplitude of the symbol, once inserted in the frequency channel, approximates the amplitude of the audio signal at the frequency range at which the spectral well was created.

4. The method of claim 1, comprising:
    prior to creating a spectral well, determining a time range of the audio signal at which a symbol is to be inserted during the inserting, and
    creating the spectral well by removing a portion of the audio signal corresponding to the determined time range.

5. The method of claim 1, wherein the inserting the symbols includes:
    modulating of the watermark signal with a carrier frequency in a frequency range of a frequency channel to obtain a modulated watermark signal; and
    superimposing the modulated watermark signal onto the audio signal.

6. The method of claim 1, wherein the inserting the symbols includes at least one of:
    a) modulating of the watermark signal with a carrier frequency in a frequency range of a frequency channel in which a symbol is to be inserted to obtain a modulated watermark signal and modify amplitude of the modulated watermark signal such that the amplitude of the modulated watermark signal approximates amplitude of a portion of the audio signal removed to create a spectral well in the frequency channel to obtain a modified-amplitude modulated watermark signal, or
    b) modify amplitude of the watermark signal such that the amplitude of the watermark signal approximates amplitude of the portion of the audio signal removed to create the spectral well in the frequency channel to obtain a modified-amplitude watermark signal and modulating of the modified-amplitude watermark signal with a carrier frequency in the frequency range of the frequency channel in which the symbol is to be inserted to obtain the modified-amplitude modulated watermark signal; and
    after creating the spectral well, superimposing the modified-amplitude modulated watermark signal on the audio signal.

7. A machine or group of machines for watermarking an audio signal, comprising:
    an input configured to receive the audio signal and a watermark signal including symbols to be inserted in predetermined frequency channels, each of the predetermined frequency channels corresponding to a different frequency range of the audio signal;
    a signal to noise controller configured to determine a ratio of (a) amplitude of a symbol to be inserted in one of the predetermined frequency channels over (b) amplitude of the audio signal corresponding to the one of the predetermined frequency channels;
    a spectral well creator circuit configured to when the ratio is below a threshold, create one or more a spectral wells well on the audio signal by removing one or more portions a portion of the audio signal corresponding to respective one or more of the one of the predetermined frequency channels; and a watermark inserter circuit configured to insert the symbols in respective ones of the predetermined frequency channels including a predetermined frequency channel in which a spectral well was created and a predetermined frequency channel in which a spectral well was not created.

8. The machine or group of machines of claim 7, wherein the spectral well creator circuit includes a band-stop filter with a center frequency in a frequency range of the respective frequency channel and is configured to pass the audio signal through the band-stop filter.

9. The machine or group of machines of claim 7, comprising:

a signal to noise ratio controller configured to, prior to the spectral well creator creating a spectral well, determine amplitude of a portion of the audio signal corresponding to a frequency range of a frequency channel at which the spectral well is to be created; and a watermark modifier configured to amplify or attenuate a symbol to be inserted in the frequency channel such that amplitude of the symbol, once inserted in the frequency channel, approximates the amplitude of the portion of the audio signal removed by the spectral well creator to create the spectral well.

10. The machine or group of machines of claim 7, comprising:

a watermark modulator configured to modulate the watermark signal with a carrier frequency in a frequency range of a frequency channel in which a symbol is to be inserted to obtain a modulated watermark signal, wherein the watermark inserter is configured to insert the symbol in the spectral well by superimposing the modulated watermark signal onto the audio signal.

11. The machine or group of machines of claim 7, comprising:

a watermark modulator configured to at least one of:

modulate the watermark signal with a carrier frequency in a frequency range of a frequency channel in which a symbol is to be inserted to obtain a modulated watermark signal and modify amplitude of the modulated watermark signal such that the amplitude of the modulated watermark signal approximates amplitude of a portion of the audio signal removed to create a spectral well in the frequency channel to obtain a modified-amplitude modulated watermark signal, or modify amplitude of the watermark signal such that the amplitude of the watermark signal approximates amplitude of the portion of the audio signal removed to create the spectral well in the frequency channel to obtain a modified-amplitude watermark signal and modulating of the modified-amplitude watermark signal with a carrier frequency in the frequency range of the frequency channel in which the symbol is to be inserted to obtain the modified-amplitude modulated watermark signal, wherein the watermark inserter is configured to insert the symbol in the spectral well by superimposing the modified-amplitude modulated watermark signal onto the audio signal.

12. The machine or group of machines of claim 7, comprising:

a watermark masker configured to, prior to the spectral well creator creating a spectral well, determining a time range of the audio signal at which a symbol is to be inserted, wherein the spectral well creator circuit is configured to create the spectral well by removing a portion of the audio signal corresponding to the determined time range.

13. A machine or group of machines for inserting watermarking symbols in predetermined frequency channels of an audio signal, each of the frequency channels corresponding to a different frequency range of the audio signal, comprising:

an input configured to receive the audio signal;

a signal to noise controller configured to determine a ratio of (a) amplitude of a symbol to be inserted in one of the predetermined frequency channels over (b) amplitude of the audio signal corresponding to the one of the predetermined frequency channels; and a spectral well creator circuit configured to when the ratio is below a threshold, create one or more a spectral wells well on the audio signal by removing one or more portions a portion of the audio signal corresponding to respective one or more of the one of the predetermined frequency channels in which the watermarking symbols are to be inserted.

14. The machine or group of machines of claim 13, wherein the spectral well creator circuit includes a band-stop filter with a center frequency in a frequency range of the respective frequency channel and is configured to pass the audio signal through the band-stop filter.

15. The machine or group of machines of claim 13, comprising:

a watermark modifier configured to amplify or attenuate amplitude of a symbol to be inserted in a frequency channel such that the amplitude of the symbol, once inserted in the frequency channel, approximates amplitude of a portion of the audio signal removed by the spectral well creator to create the spectral well.

16. The machine or group of machines of claim 13, comprising:

a watermark modifier configured to modulate the watermark signal with a carrier frequency in a frequency range of a frequency channel in which a symbol is to be inserted to obtain a modulated watermark signal; and a watermark inserter configured to insert the symbol in the spectral well by superimposing the modulated watermark signal onto the audio signal.

17. The machine or group of machines of claim 13, comprising:

a watermark modifier configured to at least one of:

modulate the watermark signal with a carrier frequency in a frequency range of a frequency channel in which a symbol is to be inserted to obtain a modulated watermark signal and modify amplitude of the modulated watermark signal such that the amplitude of the modulated watermark signal approximates amplitude of a portion of the audio signal removed to create a spectral well in the frequency channel to obtain a modified-amplitude modulated watermark signal, or modify amplitude of the watermark signal such that the amplitude of the watermark signal approximates amplitude of the portion of the audio signal removed to create the spectral well in the frequency channel to obtain a modified-amplitude watermark signal and modulating of the modified-amplitude watermark signal with a carrier frequency in the frequency range of the frequency channel in which the symbol is to be inserted to obtain the modified-amplitude modulated watermark signal; and a watermark inserter configured to insert the symbol in the spectral well by superimposing the modified-amplitude modulated watermark signal onto the audio signal.

\* \* \* \* \*